Patented Jan. 15, 1952

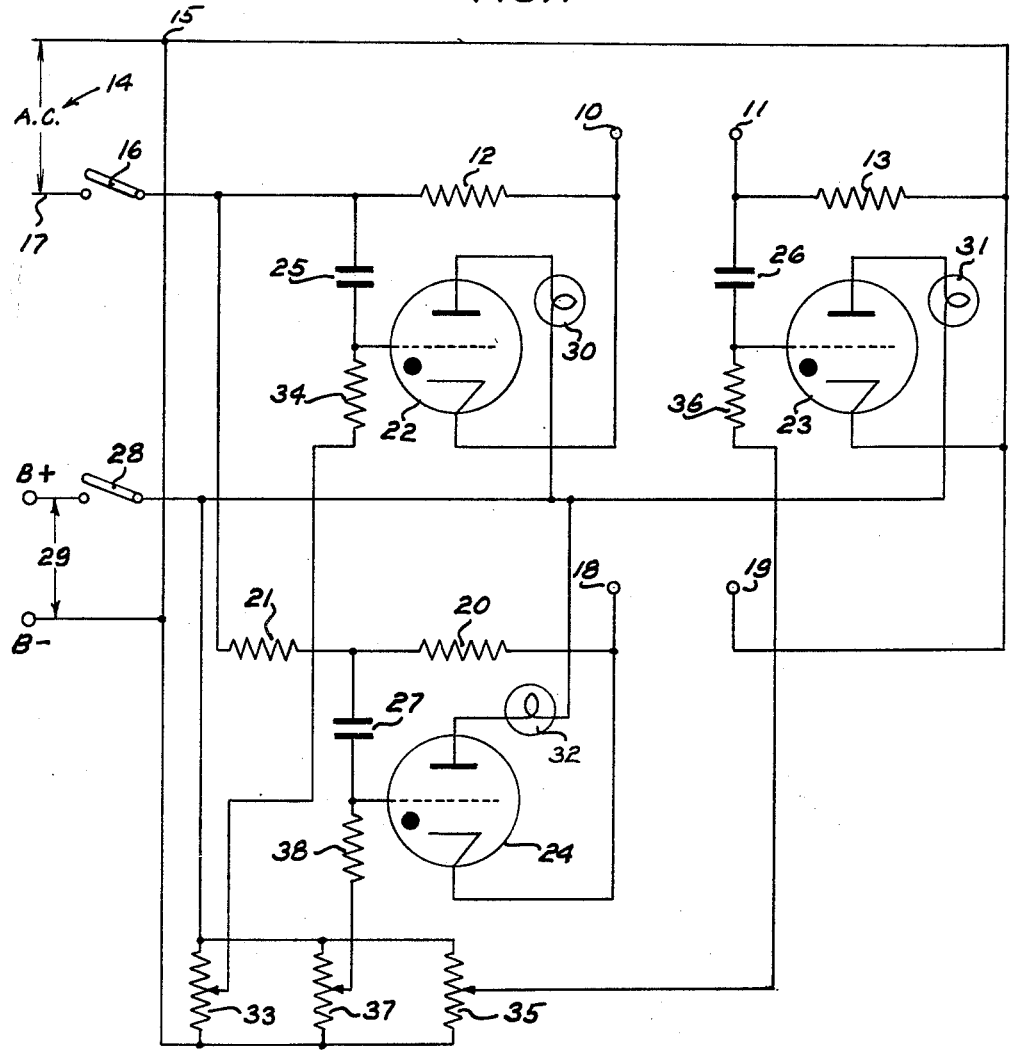

2,582,499

UNITED STATES PATENT OFFICE 2,582,499

ELECTRICAL TEST CIRCUIT

Henry L. Messerschmidt, Oak Park, Ill., assignor to Western Electric Company, Incorporated, New York, N. Y., a corporation of New York Application December 2, 1949, Serial No. 130,667

9 Claims. (Cl. 175—183)

This invention relates to electrical test equipment and more particularly to a test circuit for checking a pair of electrical conductors for continuity, reverses and short circuits.

In the manufacture and use of electrical conductors it is often necessary or desirable to check the conductors to determine whether or not they contain any flaws. More particularly it is desirable to determine whether or not a pair of conductors are continuous and are free from reversed connections and short circuits.

An object of this invention is to provide a completely automatic device for determining the faults, if any, in a pair of conductors.

In accordance with one embodiment of the invention a test circuit for checking a pair of conductors for continuity, reversed connections and short circuits is provided which utilizes three gaseous type electronic tubes, each having an indicator in its plate circuit. The pair of conductors to be tested are so connected to the control grids of the three tubes that presence of any one of the three faults mentioned above will cause a different combination of the tubes to conduct, thus giving a visual indication of the particular fault.

A more complete understanding of the invention may be had by referring to the following detailed description when read in conjunction with the accompanying drawings, wherein:

Fig. 1 is a schematic circuit diagram of a preferred embodiment of the invention; and Fig. 2 is a chart showing the various combinations of indicators which may be lighted by the various possible faults.

Referring now to the drawings and more particularly to Fig. 1 thereof, a pair of test terminals or clips 10 and 11 are provided, which clips are connected through resistors 12 and 13, respectively, to opposite sides of a source of alternating current 14, the terminal 11 being connected through the resistor 13 to one side 15 of the source of alternating current 14 and the terminal 10 being connected through the resistor 12 and a switch 16 to the other side 17 of the source of alternating current 14. A second pair of test terminals or clips 18 and 19 are also provided, the terminal 19 being connected directly to the side 15 of the source of alternating current and the terminal 18 being connected through a pair of resistors 20 and 21 to the other side 17 of the source of alternating current. The circuit further includes three gaseous type electronic discharge tubes 22, 23, and 24, each having an anode, control electrode and cathode. The cathode of tube 22 is connected directly to the test terminal 10 and to one side of the resistor 12 and the grid of tube 22 is connected through a blocking capacitor 25 to the other side of the resistor 12. Thus the voltage drop across the resistor 12 will be impressed upon the control grid of the tube 22.

The tube 23 has its cathode connected to one side of the resistor 13 and its control grid connected through a blocking capacitor 26 directly to the test terminal 11 and the other side of the resistor 13. Thus the voltage drop across resistor 13 will be impressed upon the control grid of tube 23. The tube 24 has its cathode connected directly to the test terminal 19 and to one side of the resistor 20. The control grid of the tube 24 is connected through a blocking capacitor 27 to the junction point between the serially connected resistors 20 and 21. Thus the voltage drop across the resistor 20 will be impressed upon the control electrode of the tube 24. Each of the tubes 22, 23 and 24 are connected through a switch 28 to a direct current power supply 29, the tubes 22, 23 and 24 having their plates connected through suitable indicating devices 30, 31 and 32, respectively, to the positive side of the direct current supply 29. A direct current bias voltage is also provided for each of the tubes 22, 23 and 24, the control grid of the tube 22 being supplied with a bias voltage from a potentiometer 33 through an isolating and limiting resistor 34. The grid of the tube 23 is likewise supplied with a bias voltage from a potentiometer 35 through an isolating and limiting resistor 36, and the grid of the tube 24 is supplied with a source of bias voltage from a potentiometer 37 through an isolating and limiting resistor 38. The potentiometers 33, 35 and 37 have their fixed resistance elements connected in parallel across the source of direct current potential 29.

In the operation of the circuit, assuming that it is desired to test a pair of conductors for continuity, the first of the pair of conductors has its opposite ends connected to the test terminals 10 and 11, and the second of the pair of conductors has its opposite ends connected to the test terminals 18 and 19. Assuming that both of the conductors under test are continuous and otherwise have no faults, and that switch 28 is closed, closure of the switch 16 causes a flow of alternating current from the side 17 of the source of alternating current 14 through resistor 12, terminal 10, a conductor under test, terminal 11, resistor 13 and back to the side 15 of the source of alternating current. At the same time a parallel circuit is completed through the resistor 21, resistor 20, terminal 18, the second conductor under test, terminal 19 and back to the source of alternating current. Under these conditions the resistance of resistor 12, which is of a preselected value, does not cause sufficient voltage drop thereacross to cause the tube 22 to be fired. On the other hand the resistance of resistor 13 is of such a preselected value that the current flowing therein under this condition does cause a sufficient voltage drop thereacross to cause the tube 23 to be fired thereby energizing the indicator 31. At the same time the current flow through the resistor 20 is likewise of such a value as to cause a voltage drop thereacross sufficient to cause the tube 24 to be fired thereby energizing the indicator 32. Thus it will be seen that lighting of the indicators 31 and 32 indicates that each of the pair of conductors is continuous.

Assuming now that the pair of conductors under test contains one conductor which is not continuous and assuming further that the discontinuous conductor is connected between the test terminals 10 and 11, it is obvious that no current will flow through either of the resistors 12 or 13; therefore, neither of the tubes 22 or 23 will be fired. On the other hand current will flow through the resistor 20 and the continuous conductor connected between the terminals 18 and 19 thereby causing the tube 24 to fire as before. Thus it is obvious that lighting of the indicator 32 alone indicates that the conductor connected between terminals 10 and 11 is not continuous.

Assuming now that the conductor between the terminals 10 and 11 is continuous and the conductor between the terminals 18 and 19 is discontinuous, the current flow through the resistors 12 and 13 will be such that the tube 22 will not fire and the tube 23 will fire, as in the case of the two continuous conductors. On the other hand no current will flow through the resistor 20 since the circuit is broken by the discontinuous conductor between the terminals 18 and 19; therefore the tube 24 does not fire. Thus the only indicator which is lighted under this condition is the indicator 31 which indicates that the conductor between terminals 10 and 11 only is continuous.

For the next condition a continuous circuit is assumed for each of the conductors under test; however, these conductors are also short circuited. In this case the path of the alternating test current is through the resistor 12, the test terminal 10, through the short circuit to the test terminal 19, which is the path of least resistance, and back to the source of alternating current. Under this condition sufficient current flows through the resistor 12 to cause a voltage drop thereacross sufficient to fire the tube 22 thereby energizing the indicator 30. At the same time the parallel path of current flow is through the resistors 21 and 20, test terminal 18 to test terminal 19 and back to the source of test current. Under this condition there is sufficient voltage drop across the resistor 20 to fire the tube 24 thereby energizing the indicator 32. Thus it is obvious that the lighting of indicators 30 and 32 gives an indication of a short circuit between the two conductors under test.

The other possible condition for which a test may be made is for crossed or reversed conductors. Under this condition the terminal 10 is connected by one conductor to the terminal 19. At the same time the terminal 18 is connected by the other conductor to the terminal 11. Thus one path of the test current is through the resistor 12, terminal 10, one conductor, the terminal 19 and back to the source of test current. Under this condition the voltage drop across the resistor 12 is substantially equal to the applied A. C. voltage and is sufficient to cause the tube 22 to be fired thereby giving a visual indication at indicator 30. The parallel flow of current is then through resistor 21, resistor 20, test terminal 18 and the other conductor, test terminal 11 and resistor 13. Since the resistors 21, 20 and 13 are now connected in series the current flow through the resistor 20 is insufficient to fire the tube 24, and likewise the current flow through the resistor 13 is insufficient to fire the tube 23. Thus it will be seen that lighting of the indicator 30 alone indicates that the conductors under test are crossed or reversed.

Assuming that the tubes 22, 23 and 24 have substantially the same characteristics and assuming that their grid biases have been suitably regulated, the following values of resistances of the resistors 12, 13, 20 and 21 may be employed: resistor 12—200 ohms, resistor 13—800 ohms, resistor 20—800 ohms, resistor 21—200 ohms. Under other conditions different resistance values may be employed depending upon the tube characteristics, the grid biases applied and the A. C. voltage supply. For example, it is possible to eliminate entirely the resistance 21 by regulating the potentiometer 37 to vary the bias applied to the grid of the tube 24. In this case the resistance 20 should be raised in value slightly in order that in the case of reversed conductors the voltage drop across the resistances 13 and 20 will be insufficient to fire the tubes 23 and 24. On the other hand, the grid bias on the tube 24 must be regulated so that in the case of a continuous conductor between terminals 18 and 19 the voltage drop across the resistor 20 which will be substantially equal to the supply voltage, will permit firing of tube 24 at this time. It is further possible with the proper selection of tubes and resistors to eliminate the separate grid bias potentiometers 33, 35 and 37 and to substitute therefor one grid bias potentiometer. However, in such cases the flexibility of the circuit is decreased.

Although a separate direct current supply has been shown and described, it is obvious that it is possible to derive the direct current supply from the source of test current 14 by any well-known means. Although the indicators 30, 31 and 32 have been indicated schematically in the drawing as being small lamps, in actual practice any type of indicator or indicating device may be employed. For example, the indicating devices may be energized through relay contacts which may be actuated by relay coils disposed in the plate circuits of the three tubes. Since the tubes employed are gas-filled tubes, their characteristics are such that once they have been fired their respective grids no longer can operate to cause them to stop conducting. Consequently, after each test it is necessary to open the switch 28 in order that any tubes which have been fired by the test will have their plate current supplies cut off and thereby stop conducting.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Electrical testing apparatus for testing a pair of conductors comprising a source of alternating current, a pair of terminals for connection to opposite ends of one of the conductors of said pair, a first resistor, a first gas-filled electronic tube having its cathode connected to one of said terminals and also being connected through said first resistor to the control grid of said first tube, said control grid being connected to one side of said source of alternating current, a second resistor, a second gas-filled electronic tube having its control grid connected to the other of said terminals and being connected through said second resistor to the other side of the source of alternating current and to the cathode of said second tube, a second pair of terminals for connection to the opposite ends of the other of said pair of conductors, a pair of resistors connecting one of said second pair of terminals to said one side of the source of alternating current, a third gas-filled tube having its cathode connected to said one of said second pair of terminals and having its control grid connected to the junction of said pair of resistors, a conductor connecting the other of said second pair of terminals to the other side of the source of alternating current, and indicating devices disposed in the plate circuits of each of said three tubes.

2. A test circuit for testing a pair of conductors for continuity, short circuits and reverses, comprising a source of alternating current, two pairs of test terminals connected in parallel across said source of alternating current, a resistor connected between each of the first pair of test terminals and opposite sides of the alternating current source, a pair of gaseous discharge tubes each having one of said resistors in its grid circuit, a second pair of resistors serially connected between one of the second pair of terminals and one side of said alternating current source, a third gaseous discharge tube having the one of said second pair of resistors nearest said one of the second pair of terminals in its grid circuit, direct current means for biasing said tubes, and an indicating device in the plate circuit of each of said tubes energizable by a flow of plate current therein.

3. Electrical test equipment for testing a pair of conductors comprising a first resistor, a second resistor, a third resistor, means including one of said conductors under test serially connecting said first and second resistors, means including the other of said conductors under test connecting said third resistor in parallel with said first and second resistors, a source of test voltage connected across said parallel circuit, first electronically controlled indicating means operative in response to the voltage drop across said second resistor when in series with said first resistor, second electronically controlled indicating means operative in response to a voltage drop across said third resistor substantially equal to said test voltage, said first and second electronically controlled indicating means being inoperative when said second and third resistors are in series, and third electronically controlled indicating means operative in response to a voltage drop across said first resistor substantially equal to said test voltage.

4. Electrical testing apparatus for testing a pair of conductors comprising a first resistor, a second resistor, a third resistor, a fourth resistor, said third and fourth resistors being connected in series, means including one of said conductors under test serially connecting said first and second resistors, means including the other of said conductors under test connecting said third and fourth resistors in parallel with said first and second resistors, a source of test voltage connected across said parallel circuit, first electronically controlled indicating means operative in response to the voltage drop across said second resistor when in series with said first resistor, second electronically controlled indicating means operative in response to a voltage drop across said third resistor when in series with said fourth resistor alone, said first and second electronically controlled indicating means being inoperative when said second, third and fourth resistors are in series, and third electronically controlled indicating means operative in response to a voltage drop across said first resistor substantially equal to said test voltage.

5. Electrical testing apparatus for testing a pair of conductors comprising a pair of terminals for connection to opposite ends of one of the conductors of said pair, a first resistor, a first gaseous discharge tube having its cathode connected to one of said terminals, said one terminal also being connected through said first resistor to the control grid of said first tube, said control grid being connected to one side of a source of alternating current, a second resistor, a second gas-filled tube having its control grid connected to the other of said terminals, said other terminal being connected through said second resistor to the other side of the source of alternating current and to the cathode of said second tube, a second pair of terminals for connection to the opposite ends of the other of said pair of conductors, a third resistor connecting one of said second pair of terminals to said one side of the source of alternating current, a third gas-filled tube having its cathode connected to said one of said second pair of terminals and having said third resistor in its grid circuit, a conductor connecting the other of said second pair of terminals to the other side of the source of alternating current and indicating devices disposed in the plate circuits of each of said three tubes.

6. A test circuit for testing a pair of conductors comprising a source of alternating current, two pairs of test terminals connected in parallel across said source of alternating current, a resistor connected between each of the first pair of test terminals and opposite sides of the alternating current source, a pair of gaseous discharge tubes each having one of said resistors in its grid circuit, a third resistor connected between one of the second pair of terminals and one side of said alternating current source, a third gaseous discharge tube having said third resistor in its grid circuit, direct current means for biasing said tubes, a direct current plate supply for said tubes, and an indicating device in the plate circuit of each of said tubes energizable by a flow of plate current therein.

7. A test circuit for testing a pair of electrical conductors comprising two gaseous discharge tubes having at least an anode, a cathode and a control grid, an indicating device in the plate circuit of each tube, resistance load elements in the grid circuit of each tube, means connecting said resistance elements in series through a conductor under test, a source of test voltage, means connecting said test voltage across said series connected resistance elements, said resistance elements being of such a predetermined value when in series that the voltage drop across the first resistance is insufficient to fire the first of said tubes and the voltage drop across the second resistance is sufficient to fire the second of said tubes, a third gaseous discharge tube having at least an anode, a cathode and a control grid, an indicating device in the plate circuit of said third tube, a resistance load element in the grid circuit of said third tube, means connecting said last-mentioned resistance element across said test voltage through a second conductor under test, said last-mentioned resistance element being of such a predetermined value that a voltage drop thereacross substantially equal to the test voltage is sufficient to fire said third tube, and means for energizing said tubes.

8. A test circuit for testing a pair of conductors for continuity, short circuits and reverses, which comprises a source of alternating current, a first pair of test terminals connected across the source of alternating current, a second pair of test terminals connected across the source of alternating current in parallel with the first pair of terminals, a pair of impedances connected between each of the first pair of test terminals and the opposite sides of the alternating current source, a pair of cold cathode tubes each having one of said impedances in its grid circuit, a third impedance serially connected between one of the second pair of terminals and one side of the alternating current source, a third cold cathode tube having the third impedance in its grid circuit, direct current means for biasing said tubes, and indicating devices in the plate circuit of the tubes energizable by a flow of plate current therein.

9. An electrical test circuit for testing a pair of conductors for continuity, shorts and reverses, which comprises a first impedance, a second impedance, a third impedance, means including one of said conductors under test serially connecting the first and second impedances, means including the other of the conductors under test for connecting the third impedance in parallel with the first and second impedances, a source of alternating current connected across said parallel circuits, a first electronic device responsive to voltage drop across the second impedance when the second impedance is in series with the first impedance, a second electronic device responsive to a voltage drop across the third impedance substantially equal to the test voltage, the first and second electronic devices being inoperative when the second and third impedances are in series, a third electronic device responsive to a voltage drop across the first impedance substantially equal to the test voltage, and a plurality of indicating means operable individually by the electronic devices.

HENRY L. MESSERSCHMIDT.

REFERENCES CITED

The following references are of record in the file of this patent:

UNITED STATES PATENTS

| Number | Name | Date |
|---|---|---|
| 2,087,783 | Savage | July 20, 1937 |
| 2,451,953 | Ingram | Oct. 19, 1948 |
| 2,473,344 | McCown | June 14, 1949 |